US012787065B2

(12) United States Patent
Di Taranto et al.

(10) Patent No.: US 12,787,065 B2
(45) Date of Patent: Nov. 3, 2026

(54) REDUCING OR AVOIDING INTERFERENCE, AND TRANSMITTING A FRAME

(71) Applicant: Telefonaktiebolaget LM Ericsson (publ), Stockholm (SE)

(72) Inventors: Rocco Di Taranto, Lund (SE); Abhishek Ambede, Huddinge (SE); Guido Roland Hiertz, Aachen (DE); Lakshmikanth Guntupalli, Lund (SE); János Farkas, Kecskemét (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 246 days.

(21) Appl. No.: 18/726,568

(22) PCT Filed: Jan. 13, 2022

(86) PCT No.: PCT/EP2022/050697
§ 371 (c)(1),
(2) Date: Jul. 3, 2024

(87) PCT Pub. No.: WO2023/134858
PCT Pub. Date: Jul. 20, 2023

(65) Prior Publication Data
US 2025/0081237 A1 Mar. 6, 2025

(51) Int. Cl.
*H04W 74/0816* (2024.01)
*H04W 74/08* (2024.01)
*H04W 84/12* (2009.01)

(52) U.S. Cl.
CPC ... *H04W 74/0816* (2013.01); *H04W 74/0875* (2013.01); *H04W 84/12* (2013.01)

(58) Field of Classification Search
CPC ......... H04W 74/0816; H04W 74/0875; H04W 84/12
See application file for complete search history.

(56) References Cited

U.S. PATENT DOCUMENTS 8,804,691 B1 * 8/2014 Zhao .................. H04L 27/2659 375/365
2014/0328191 A1 11/2014 Barriac
(Continued)

FOREIGN PATENT DOCUMENTS

EP 3369282 A 5/2017

OTHER PUBLICATIONS

International Search Report and Written Opinion dated Oct. 11, 2022 issued in PCT Application No. PCT/ EP2022/050697 filed Jan. 13, 2022, consisting of 13 pages.
(Continued)

*Primary Examiner* — Brian J. Gillis
(74) *Attorney, Agent, or Firm* — Weisberg I.P. Law, P.A.

(57) ABSTRACT

Methods and apparatus are provided. In an example aspect, a method in a station (STA) of reducing or avoiding interference is provided. The method includes receiving at least a preamble or a physical layer (PHY) header of a frame, wherein the preamble or the physical layer (PHY) header includes an indication that one or more STAs should reduce or avoid causing interference during the transmission of the frame or for a duration of a transmit opportunity (TXOP) during which the frame is transmitted. The method also includes reducing or avoiding interference during the transmission of the frame or for the duration of the TXOP during which the frame is transmitted.

20 Claims, 2 Drawing Sheets

300

(56) References Cited

U.S. PATENT DOCUMENTS

| | | | | |
|---|---|---|---|---|
| 2015/0063327 A1 | 3/2015 | Barriac et al. | | |
| 2016/0192395 A1* | 6/2016 | Yoo | H04W 74/0808 | 370/329 |
| 2017/0127448 A1* | 5/2017 | Zhou | H04W 74/0816 | |

OTHER PUBLICATIONS

Farkas J., Focus on the Time Sensitive Networking Task Group; Introduction to IEEE 802.1 (focus on TSN TG); May 15, 2017, consisting of 50 pages.

IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications Amendment 1: Enhancements for High-Efficiency WLAN; IEEE Computer Society; IEEE Std 802.11ax™-2021 (Amendment to IEEE Std 802.11-2020); Feb. 9, 2021, consisting of 767 pages.

IEEE Standard for Information Technology—Telecommunications and Information Exchange between Systems Local and Metropolitan Area Networks—Specific Requirements; Part 11: Wireless LAN Medium Access Control (MAC) and Physical layer (PHY) Specifications; EEE Computer Society; IEEE Std 802.11-™-2020 (Revision of IEEE Std 802.11-2016); Dec. 3, 2020, consisting of 4379 pages.

* cited by examiner

100

200

300

REDUCING OR AVOIDING INTERFERENCE, AND TRANSMITTING A FRAME

CROSS-REFERENCE TO RELATED APPLICATION

This application is a Submission Under 35 U.S.C. § 371 for U.S. National Stage Patent Application of International Application Number: PCT/EP2022/050697, filed Jan. 13, 2022, entitled "REDUCING OR AVOIDING INTERFERENCE, AND TRANSMITTING A FRAME," the entirety of which is incorporated herein by reference.

TECHNICAL FIELD

Examples of the present disclosure relate to reducing or avoiding interference, for example when a frame, such as an IEEE 802.11 frame, is being transmitted. Examples of the present disclosure also relate to transmitting a frame, such as an IEEE 802.11 frame.

BACKGROUND

The availability of a large amount of license-exempt spectrum in the 6 GHz frequency band has led to an ever-increasing interest in new features that would enable IEEE 802.11 wireless local area networks (WLANs), commonly referred to as Wi-Fi networks, to support communications with stringent Quality of Service (QoS) requirements such as those on latency (bounded) and reliability (high). Example scenarios include for example Industrial Internet of Things (IIoT) in factory scenarios, and augmented reality (AR) or virtual reality (VR) gaming in home or enterprise scenarios. In such scenarios, a WLAN may be required to support applications and use cases typically supported in wired networks based on time sensitive networking (TSN) standards. One strict requirement in TSN is that packets are always transmitted at the right time, i.e. a transmitter should preferably be able to access the wireless channel with a delay (latency) whose variation around the mean (jitter) is guaranteed to be bounded. Yet another strict requirement is on the reliability, meaning that a transmitted packet should be correctly received with very high probability at the receiver.

The IEEE 802.11 standards have not been developed with an emphasis on achieving bounded latency and high reliability communications. Moreover, the nature of channel access rules and some specific regulations in the 2.4 GHz and 5 GHz frequency bands prevent IEEE 802.11 based WLANs to provide deterministic or bounded channel access opportunities. There are various reasons for this. For example, while the 5 GHz frequency band has more non-overlapping channels than the 2.4 GHz frequency band (e.g. only three non-overlapping 20 MHz channels in 2.4 GHZ, and twenty-five non-overlapping 20 MHZ channels in 5 GHZ), availability of non-overlapping channels does not solve the issues resulting from the presence of devices adhering to legacy Wi-Fi generations and co-existence with other technologies (e.g. Bluetooth, Zigbee and many others) that make intensive use of these two frequency bands. Moreover, although the 5 GHz frequency band provides for operating six non-overlapping 80 MHz channels (which may be considered as the new default channel width for Wi-Fi 6 operation, with Wi-Fi 6 being the marketing term for IEEE 802.11ax compliant devices), they can only be used under the Dynamic Frequency Selection (DFS) constraints, which essentially means that in a large part of this band Wi-Fi devices must empty these channels as soon as a radar transmission is detected.

In the 6 GHz frequency band, due to the large number of channels available (in the USA for example there are 59 non-overlapping 20 MHz channels or 29 non-overlapping 40 MHZ channels) and since DFS is not required, Wi-Fi 6E devices (i.e. Wi-Fi 6 devices operating in the 6 GHz frequency band) are expected to have the capability to support bounded latency and high reliability (e.g. less than 10 ms latency with multiple nines reliability) when operated in a completely controlled environment. A controlled environment is described as an environment which contains devices operating in the license-exempt spectrum and that are only installed by the facility owner, and where unexpected interference from other systems and/or radio access technologies may only happen sporadically. As an example, in a factory with a completely controlled environment, the facility owner may be able to, with proper channel planning, deploy one AP per channel. While this would be in principle also possible in the 5 GHz frequency band, there are few reasons that make this more realistic in the 6 GHz frequency band. Most importantly, in the 6 GHz band there will not be legacy Wi-Fi devices. Only Wi-Fi 6E certified devices (supporting OFDMA scheduling capabilities) will have access to this band. This means that the devices may always operate in scheduled OFDMA mode, thus completely removing contention for access to the wireless medium within a single cell or basic service set (BSS). Additionally, there are currently no devices other than those implementing Wi-Fi 6E that would be capable of operating in the 6 GHZ band, and even if such devices are present in the future, the 6 GHz frequency band may never be as populated as the 2.4 GHz and 5 GHz frequency bands, especially in environments like factories and industries.

More generally, even when operated in non-controlled 6 GHz frequency band environments Wi-Fi 6E performance may be quite different from legacy Wi-Fi (including Wi-Fi 6). Although in these conditions it cannot be guaranteed that each AP has always its own interference-free-channel, Wi-Fi 6E devices will anyway leverage the advantages inherent to the 6 GHz band (discussed above). Furthermore, if the applications would require slightly more relaxed requirements as it may be reasonable for applications such as gaming, AR/VR, ProAV and similar (that are known to have more relaxed requirements than IIoT devices operated in controlled environments) it becomes apparent that Wi-Fi 6E may be a successful technology in addressing many new use-cases, which may not be adequately supported in the 2.4 GHz and 5 GHz frequency bands.

SUMMARY

In examples of this disclosure, identification of critical data and prioritization of corresponding data frames may be achieved in networks such as Wi-Fi networks so that, for example, stringent requirements in terms of latency and reliability may be met in unlicensed frequency bands. This may be an important and valuable step for example in extending support for TSN-like transmissions into unlicensed frequency bands and Wi-Fi. Furthermore, some examples may not use coordination or synchronization among devices.

One aspect of the present disclosure provides a method in a station (STA) of reducing or avoiding interference. The method comprises receiving at least a preamble or a physical layer (PHY) header of a frame, wherein the preamble or the physical layer (PHY) header includes an indication that one or more STAs should reduce or avoid causing interference during the transmission of the frame or for a duration of a transmit opportunity (TXOP) during which the frame is transmitted. The method also comprises reducing or avoiding interference during the transmission of the frame or for the duration of the TXOP during which the frame is transmitted.

Another aspect of the present disclosure provides a method in a station (STA) of transmitting a frame. The method comprises transmitting the frame, wherein the frame includes a preamble or a physical layer (PHY) header, and wherein the preamble or the physical layer (PHY) header includes an indication that one or more other STAs should reduce or avoid causing interference during the transmission of the frame or for a duration of a transmit opportunity (TXOP) during which the frame is transmitted.

A further aspect of the present disclosure provides apparatus in a station (STA) for reducing or avoiding interference. The apparatus comprises a processor and a memory. The memory contains instructions executable by the processor such that the apparatus is operable to receive at least a preamble or a physical layer (PHY) header of a frame, wherein the preamble or the physical layer (PHY) header includes an indication that one or more STAs should reduce or avoid causing interference during the transmission of the frame or for a duration of a transmit opportunity (TXOP) during which the frame is transmitted, and reduce or avoiding interference during the transmission of the frame or for the duration of the TXOP during which the frame is transmitted.

A still further aspect of the present disclosure provides apparatus in a station (STA) for transmitting a frame. The apparatus comprises a processor and a memory. The memory contains instructions executable by the processor such that the apparatus is operable to transmit the frame, wherein the frame includes a preamble or a physical layer (PHY) header, and wherein the preamble or the physical layer (PHY) header includes an indication that one or more other STAs should reduce or avoid causing interference during the transmission of the frame or for a duration of a transmit opportunity (TXOP) during which the frame is transmitted.

Another aspect of the present disclosure provides apparatus in a station (STA) for reducing or avoiding interference. The apparatus is configured to receive at least a preamble or a physical layer (PHY) header of a frame, wherein the preamble or the physical layer (PHY) header includes an indication that one or more STAs should reduce or avoid causing interference during the transmission of the frame or for a duration of a transmit opportunity (TXOP) during which the frame is transmitted, and reduce or avoiding interference during the transmission of the frame or for the duration of the TXOP during which the frame is transmitted.

An additional aspect of the present disclosure provides apparatus in a station (STA) for transmitting a frame. The apparatus is configured to transmit the frame, wherein the frame includes a preamble or a physical layer (PHY) header, and wherein the preamble or the physical layer (PHY) header includes an indication that one or more other STAs should reduce or avoid causing interference during the transmission of the frame or for a duration of a transmit opportunity (TXOP) during which the frame is transmitted.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g. analog and/or discrete logic gates interconnected to perform a specialized function, Application Specific Integrated Circuits (ASICs), Programmable Logic Arrays (PLAs), etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g. digital or analogue) circuitry including but not limited to application specific integrated circuit(s) (ASIC) and/or field programmable gate array(s) (FPGA(s)), and (where appropriate) state machines capable of performing such functions.

Figure 1:
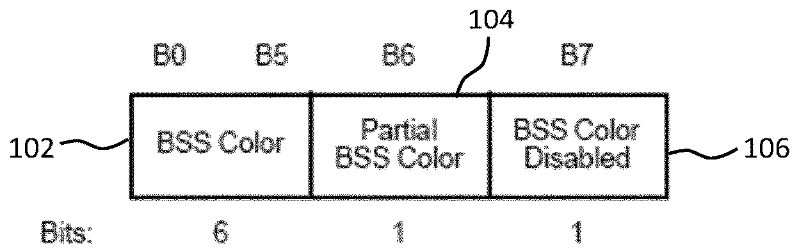
FIG. 1 shows an example of a BSS Color Information field in a PHY header.

IEEE Std 802.11ax-2021 is an amendment to IEEE Std 802.11-2020. Subclause 27.17.3 in IEEE Std 802.11ax-2021 describes the basic service set (BSS) coloring mechanism supported in Wi-Fi 6 devices, and which is not supported by legacy devices. With BSS coloring, a Wi-Fi 6 client can rapidly determine the difference between inter- and intra-BSS frames by inspecting the BSS Color sub-field contained in the PHY header of all Wi-Fi 6 frames. FIG. 1 shows an example of a BSS Color Information field 100 in a PHY header. The field 100 includes a BSS Color sub-field 102, as well as a partial BSS Color bit 104 and BSS Color Disabled bit 106. Subclause 26.17.3 specifies that the BSS color identifies a BSS and assists a station (STA), such as an Access Point STA (AP STA) or non-AP STA, receiving a physical protocol data unit (PPDU) that carries a BSS color in identifying the BSS from which the PPDU originates, so that the STA can use different channel access rules (e.g. apply different preamble detect (PD) thresholds for intra-BSS and extra-BSS packets, subclause 26.10), reduce power consumption (subclause 26.14.1), or update its Network Allocation Vector (NAV, subclause 26.2.4). The color in BSS coloring is an index number from 1 to 63 indicated using a sub-field 102 of 6 bits in the BSS Color Information field 100. It is assigned either manually or coordinated through Radio Resource Management (RRM) to individual access points (APs) along with the channel assignment. APs in vicinity should ideally use channels with different colors. Different mechanisms exist to avoid color overlaps.

Traffic classification (TCLAS) for IEEE 802 networks has been introduced by the 3-bit Priority Code Point (PCP) field carried in Virtual Local Area Network (VLAN) tags as specified by IEEE Std 802.1Q. The PCP is leveraged for distinguishing critical traffic, e.g. distinguishing TSN streams from less critical or non-critical traffic such as best effort traffic. IEEE Std 802.11ak-2018 is an amendment to IEEE Std 802.11-2016 and provides bridging services similar to Ethernet. Because IEEE Std 802.11-2020 incorporates both in a single document, the standard defines traffic stream classification mechanisms through support for VLAN tag traffic stream differentiation in Wi-Fi networks, therefore enabling seamless operation on top of the 802.11 MAC/PHY layers.

Figure 2:
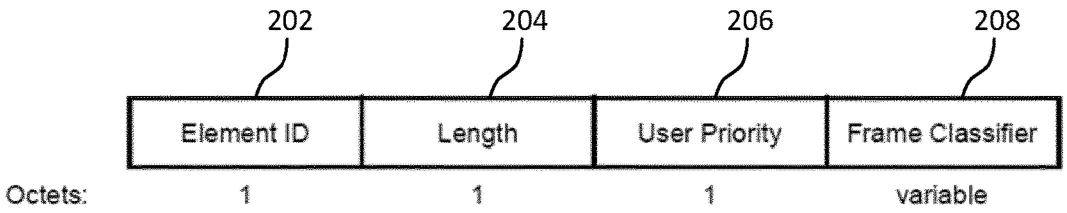
FIG. 2 shows an example of a TCLAS element.

The TCLAS element contains a set of parameters necessary to identify various kinds of PDU or incoming MAC service data unit (MSDU) that belong to a particular traffic stream. In Wi-Fi, the User Priority is covered using the User Priority (UP) field in the TCLAS element as described using FIG. 9-302 and Table 9-163 on page 1077 in the IEEE Std 802.11-2020. The TCLAS element 200 is shown in FIG. 2. The TCLAS element 200 includes an Element ID octet 202, length octet 204, User Priority (UP) octet 206, and variable length Frame Classifier 208. Then, if the value contained in the UP field 206 is in the range 0-7, it corresponds to the 8 priorities according to the VLAN, and is used to specify the UP of the associated MSDUs.

There is a Classifier Type subfield within the Frame Classifier field 208. The Classifier Type subfield specifies the type of classifier parameters in the TCLAS element. For Classifier Type 2, the Classifier Parameter is the IEEE 802.1Q-2003 VLAN Tag TCI (Tag Control Information). The endianness of the IEEE 802.1Q VLAN TCI field is defined in IEEE Std 802.1Q for the VLAN Tag TCI. The Frame Classifier field for Classifier Type 2 is defined in FIG. 9-307 in the IEEE Std 802.11-2020.

In scenarios with overlapping BSS (OBSS), a mechanism is needed to protect or attempt to protect critical transmissions by at least sharing some sort of information related to it. Critical traffic or critical data is defined as traffic or data having stringent Quality of Service (QoS) requirements, and/or has strict requirements in terms of priority, latency and/or reliability. For example, such traffic or data may have a priority above a priority threshold, a latency requirement below a latency threshold (or latency bound) and/or a reliability above a reliability threshold.

There is currently no mechanism for an AP or non-AP STA to inform devices in its vicinity on the access category (AC) of the transmitted packet, unless the packet is fully decoded by the devices. APs and associated non-AP STAs cannot decode packets from other APs and their associated non-AP STAs if these packets are encrypted. Moreover, even if an STA is made aware of ongoing critical traffic transmissions, the STA does not currently have the ability or requirement according to a communication standard to modify its behavior to reduce or avoid interference with critical traffic. Because of this, the opportunity to protect critical traffic transmission is always missed.

In completely controlled environments, each BSS can experience contention free operations with proper channel planning. Furthermore, it is possible to select the number of STAs to associate to each AP so that certain requirements in terms of latency and reliability can be met and guaranteed with very high probability. However, this requires a completely controlled environment. In practical scenarios, other devices may be present and communicating in the same frequency band(s), and thus cause interference.

Furthermore, even if the TCLAS mechanism does in principle enable VLAN traffic identification in Wi-Fi, even with TCLAS enabled with IEEE 802.11ak, such a mechanism is only useful in directly mapping the VLAN traffic streams into the Wi-Fi Access Categories. Additionally, the TCLAS mechanism has a limitation in that the information is carried in the MAC frame (Section 9.4.2.30 in Section 9 Frame Formats in IEEE Std. 802.11-2020), so for a neighboring receiver to learn about the traffic class of the transmitted packet, the whole packet needs to be correctly decoded. Therefore, TCLAS mechanism is only useful for the intended receiver(s) of a packet because non-intended receivers typically do not (or cannot) decode packets that are not intended for them (one reason being energy saving for example). Consequently, the TCLAS mechanism is neither useful for spreading around information, nor for enforcing/suggesting any type of protection from neighbor STAs toward critical traffic.

Proposed herein are methods for a wireless communication device (e.g. a station or STA) to indicate the type of transmitted data. More specifically, for example, an indication of the type of data being transmitted is included in the preamble or PHY header of the corresponding frame (i.e. the frame containing that data) so that devices in the vicinity can easily learn about the type of the transmitted packet by simply decoding the preamble or PHY header. More generally, in some examples, the indication in the preamble or PHY header may indicate that one or more STAs (e.g. those in the vicinity of the device transmitting the frame) should reduce or avoid causing interference during the transmission of the frame or for a duration of a transmit opportunity (TXOP) during which the frame is transmitted. Thus interference caused to the frame may be reduced or avoided in some examples.

Also proposed herein are example methods whereby upon detecting a frame such as a frame described above, e.g. that carries critical data, other device(s) may either be required or invited to take one or more actions that reduce or avoid interference to the frame, and hence for example favor the transmission or delivery of the critical data.

In some examples, to indicate a particular type of transmitted data, e.g. critical data, or an indication that devices should reduce or avoid interference, the existing BSS coloring mechanism described above may be reused.

Proposed methods may for example indicate information relating to a transmitted frame, or indicate that surrounding devices should reduce or avoid interference, with a minimal change in a relevant standard such as for example 802.11, 802.11ax etc. For example, in some examples there may be no new fields in the preamble or the PHY or MAC headers, and in some examples currently reserved bits in the PHY header preamble may not be used (though one or more of these may be used in some examples). Moreover, neighbor devices can quickly determine the presence of such an indication and may for example be required or requested to reduce or avoid interference to the frame or the TXOP containing the indication.

Some examples of this disclosure provide the ability for a Wi-Fi device (e.g. a STA) to share information about the type of its transmitted data with the devices in its vicinity. In some examples, a suitable indication is included in the preamble or PHY header of the corresponding frame (i.e. the frame that contains that data). The corresponding frame can be a data frame or a control frame preceding the data frame. The preamble or PHY header may for example be decoded, at least in part, by all STAs that receive a frame with sufficient energy and may thus identify the indication. Moreover, in some examples, signaling the indication in the preamble or PHY header can also help to ensure that the devices in the vicinity can decode the information easily and quickly, since the preamble or PHY header of a frame may in some examples be encoded with robust modulation and coding and all frames begin with the preamble, and so that appropriate actions to reduce or avoid interference can be taken or enforced as soon as possible. Another advantage using the preamble or PHY header to include the indication in some examples is that overhearing devices do not need to decode the subsequent data fields of the frames, and this can thus also help in saving energy.

Figure 3:
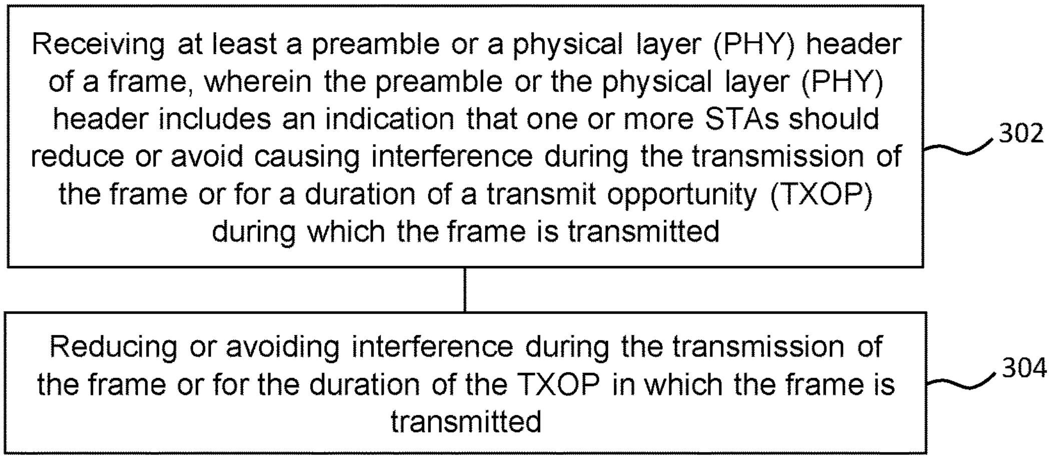
FIG. 3 is a flow chart of an example of a method in a station (STA) of reducing or avoiding interference.

FIG. 3 is a flow chart of an example of a method 300 in a station (STA), such as an AP STA or non-AP STA, of reducing or avoiding interference. The method 300 comprises, in step 302, receiving at least a preamble or a physical layer (PHY) header of a frame. The preamble or the physical layer (PHY) header includes an indication, such as for example a field, sub-field or bit, that one or more STAs should reduce or avoid causing interference during the transmission of the frame or for a duration of a transmit opportunity (TXOP) during which the frame is transmitted. Here, receiving may be for example decoding at least part of the preamble or PHY header to identify the indication and to identify whether or not the indication indicates that the STA should reduce or avoid causing interference. In some examples, the frame is transmitted (e.g. by another STA, which may be an AP or non-AP STA) in unlicensed spectrum, e.g. according to an IEEE 802.11 standard such as 802.11ax. In some examples, the frame may be transmitted according to the method 400 described below. In some examples, the one or more STAs that should reduce or avoid causing interference (e.g. that may perform or are already performing a concurrent transmission) may belong to a different BSS or OBSS than the STA performing the method 300.

Step 304 of the method 300 comprises reducing or avoiding interference during the transmission of the frame or for the duration of the TXOP during which the frame is transmitted, and possibly even outside the transmission of the frame and the TXOP, depending on the action. Thus, for example, the STA may perform one or more of the following actions:

- switching to a channel or band other than the channel or band in which the frame is transmitted;
- reducing a maximum transmission power of a further frame transmitted by the STA;
- reducing a threshold associated with Clear Channel Assessment (CCA) in the channel or band in which the frame is transmitted;
- refraining from transmitting for a predetermined time after receiving the at least the preamble or the physical layer (PHY) header of the frame;
- refraining from transmitting on frequency resources used by transmission of the frame (in some examples for a predetermined period of time); and/or
- applying precoding to reduce interference at one or more receivers of the frame.

Further details of examples of the above actions are provided as follows. Regarding switching to another channel or band, for example, if the operating channel of a BSS is the same as the operating channel of an OBSS that frequently undertakes high priority transmissions, or otherwise transmissions that indicate that other STA(s) should reduce or avoid interference with, the BSS can switch to another operating channel. This can help to reduce collisions and interference to critical data transmissions in the OBSS. The action of switching the operating channel can be enforced or voluntary. In some examples, reducing transmission power may for example comprise a STA being required to reduce or voluntarily reducing its transmission power for a certain time and/or for certain frequency resources (e.g those that interfere with the frame). Regarding reducing a threshold associated with CCA, to protect the frame that has the indication to reduce or avoid interference, stricter CCA can be mandated or voluntarily applied by neighboring STAs for a certain time and/or certain frequency resources. Thus, by making channel access stricter, this can help to reduce the interference caused due to simultaneous transmissions on the same channel. As for applying precoding to reduce interference at one or more receivers of the frame, to protect critical transmissions, nulls can be steered towards the receiving devices of this critical transmissions in order to reduce the potential interference. Moreover, more general pre-coding schemes at the transmitter may also be applied to reduce the interference.

These are merely examples and one or more other interference reducing or avoiding actions may be taken by the STA in addition to or as an alternative to the examples given above.

In some examples, the indication comprises an indication of a type of data in the frame. For example, the indication may indicate whether or not the data in the frame is critical data, or is for example data that has stringent Quality of Service (QoS) requirements, and/or has strict requirements in terms of priority, latency and/or reliability. For example, such data may have a priority above a priority threshold, a latency requirement below a latency threshold (or latency bound) and/or a reliability above a reliability threshold. Thus, for example, the data may be high priority data, low latency data and/or high reliability data.

In some examples, the indication comprises one of one or more predetermined values in a color field in the preamble. Thus for example if one of the predetermined value(s) is included in the color field (e.g. the BSS Color sub-field 102 shown in FIG. 1), then the indication indicates that the STA should reduce or avoid interference. Alternatively, in some examples, the indication may comprise a bit or field in the PHY header that is currently reserved, for example in an IEEE 802.11ax standard or earlier versions of IEEE 802.11 standard and its amendments. The indication may comprise for example a priority tag.

The color in BSS coloring is an index number from 1 to 63 indicated using the 6 bits of the BSS Color sub-field 102 in the BSS Color Information field 100 shown in FIG. 1. It is assigned in some examples either manually or coordinated through Radio Resource Management (RRM) to individual access points (APs) along with channel assignment. APs in a vicinity should preferably have channels with different colors in some examples. In examples of this disclosure, a "super-color" (e.g. a value of 63 for the BSS Color sub-field 102) or a set of super-colors (e.g. values in the range 60-63 for the BSS Color sub-field 102) may be defined as indications that one or more STAs should reduce or avoid causing interference during the transmission of the frame or for the duration of the transmit opportunity (TXOP) during which the frame is transmitted. As soon as a device detects the preamble or PHY header of an incoming frame that carries an indication that is a super-color (irrespective of whether it is intended for the device or not), the device may for example take actions to reduce or avoid interfering with the frame. In some examples, the value of the super-color from a range of super-colors may also indicate a relative priority as compared to other super-colors.

This solution may be useful from a standardization point of view in some examples as it leverages the already existing BSS coloring mechanism introduced in Wi-Fi 6 and only requires the standardization of super-color (or one or more predetermined values for the color field). As an alternative to standardizing specific values for super-colors and defining them in the IEEE 802.11 specification, other examples may introduce mechanisms for groups of APs or groups of BSSs to agree upon and operate using their own specific values for the super-colors. Such mechanisms may be used, for example, by factory owners to define super-colors that may be understood by all wireless STAs deployed in the factories as well as other, potentially interfering devices, such as for example wireless devices owned by the employees.

Figure 4:
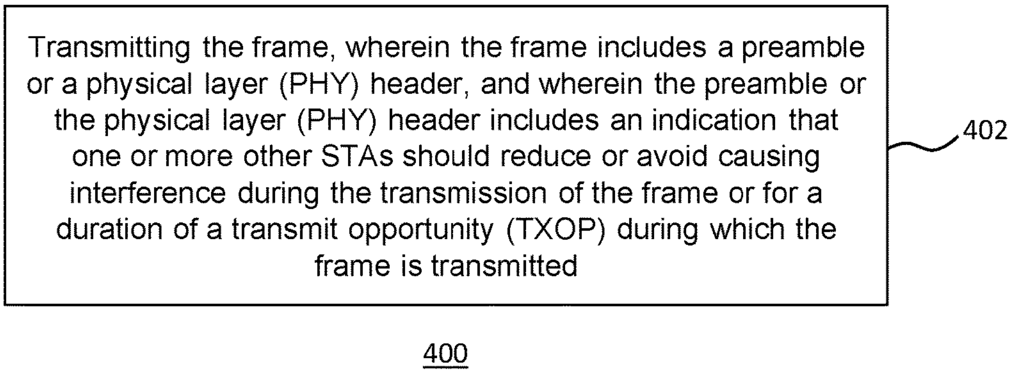
FIG. 4 is a flow chart of an example of a method in a station (STA) of transmitting a frame.

FIG. 4 is a flow chart of an example of a method 400 in a station (STA), such as for example an AP STA or non-AP STA, of transmitting a frame. The method comprises, in step 402, transmitting the frame, wherein the frame includes a preamble or a physical layer (PHY) header, and wherein the preamble or the physical layer (PHY) header includes an indication that one or more other STAs should reduce or avoid causing interference during the transmission of the frame or for a duration of a transmit opportunity (TXOP) during which the frame is transmitted. In some examples, the one or more other STAs may each be performing the method 300 described above, and hence may for example take actions to reduce or avoid interference with the frame as discussed above.

The indication may comprise for example an indication of a type of data in the frame, such as for example critical data, high priority data, low latency data and/or high reliability data as suggested above.

The indication may for example comprise one of one or more predetermined values in a color field in the preamble, as suggested above. Alternatively, for example, the indication may comprise a bit or field in the preamble or the PHY header that is reserved in an IEEE 802.11ax standard amendment or earlier versions of the IEEE 802.11 standard and its amendments.

Transmitting the frame comprises transmitting the frame in unlicensed spectrum, e.g. according to an IEEE 802.11 standard such as IEEE 802.11ax.

In some examples, before transmitting the frame, the STA may determine that a further frame is being transmitted by at least one other STA. The preamble or PHY header of the further frame may include a further indication (e.g. predetermined color value, etc.) that does not indicate that the STA should reduce or avoid causing interference during the transmission of the further frame or for the duration of the TXOP during which the further frame is transmitted. For example, the further indication may indicate that the data in the further frame is not critical data, or has a lower priority than the data that the STA wishes to transmit. In such circumstances, for example, the STA may be permitted to access the channel and transmit the frame even though the further frame is already present in the channel. Thus, in some examples, transmitting the frame in step 402 comprises transmitting the frame while the further frame is being transmitted (e.g. using one or more of the same channel(s) as the further frame).

For example, if the indication in a data frame transmitted by a STA in a BSS indicates that the type of data being carried in that frame is best-effort type, then other STAs in the same BSS may be allowed to perform overlaid data transmissions if they have critical data pending to be transmitted. This can, for example, be allowed only if the ongoing transmission is itself not a critical data transmission (e.g. the indication in the ongoing frame does not indicate that other STAs need to reduce or avoid interference). To avoid detrimental interference to the original best-effort data transmission, such overlaid transmissions may in some examples face some restrictions on transmission parameters such as transmission power, bandwidth, duration, and/or other parameter(s). Moreover, in some examples, STAs in OBSSs may be allowed (with some restrictions in some examples) to undertake their own transmissions in overlaid fashion, i.e. without waiting for the channel to become free, if they too have similar critical data pending to be transmitted, and this can be made possible by including the proposed indication of the type of data in the corresponding frames or at least an indication (or not) that other STA(s) need to reduce or avoid interference.

Figure 5:
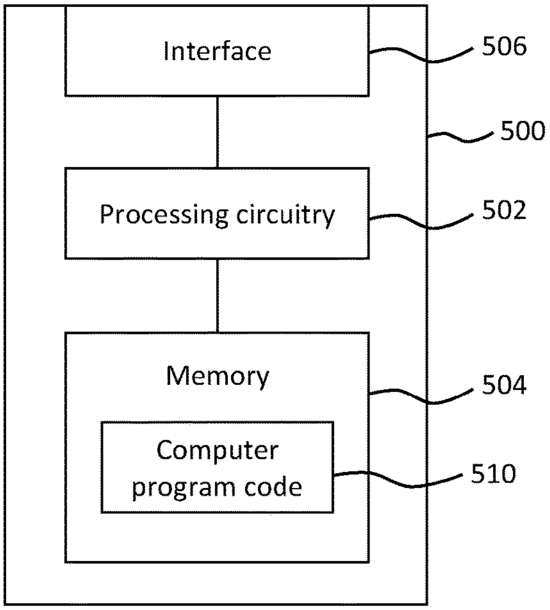
FIG. 5 is a schematic of an example of an apparatus in a station (STA) for reducing or avoiding interference.

FIG. 5 is a schematic of an example of an apparatus 500 in a station (STA) for reducing or avoiding interference. The apparatus 500 comprises processing circuitry 502 (e.g. one or more processors) and a memory 504 in communication with the processing circuitry 502. The memory 504 contains instructions, such as computer program code 510, executable by the processing circuitry 502. The apparatus 500 also comprises an interface 506 in communication with the processing circuitry 502. Although the interface 506, processing circuitry 502 and memory 504 are shown connected in series, these may alternatively be interconnected in any other way, for example via a bus.

In one embodiment, the memory 504 contains instructions executable by the processing circuitry 502 such that the apparatus 500 is operable/configured to receive at least a preamble or a physical layer (PHY) header of a frame, wherein the preamble or the physical layer (PHY) header includes an indication that one or more STAs should reduce or avoid causing interference during the transmission of the frame or for a duration of a transmit opportunity (TXOP) during which the frame is transmitted; and reduce or avoiding interference during the transmission of the frame or for the duration of the TXOP during which the frame is transmitted. In some examples, the apparatus 500 is operable/configured to carry out the method 300 described above with reference to FIG. 3.

Figure 6:
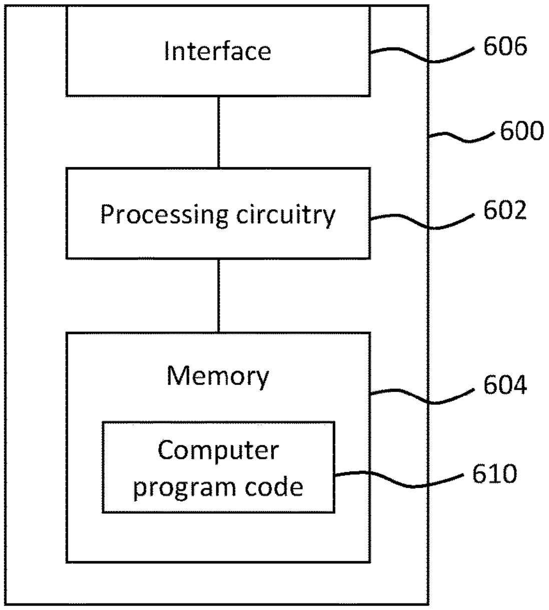
FIG. 6 is a schematic of an example of an apparatus in a station (STA) for transmitting a frame.

FIG. 6 is a schematic of an example of an apparatus 600 in a station (STA) for transmitting a frame. The apparatus 600 comprises processing circuitry 602 (e.g. one or more processors) and a memory 604 in communication with the processing circuitry 602. The memory 604 contains instructions, such as computer program code 610, executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable/configured to transmit the frame, wherein the frame includes a preamble or a physical layer (PHY) header, and wherein the preamble or the physical layer (PHY) header includes an indication that one or more other STAs should reduce or avoid causing interference during the transmission of the frame or for a duration of a transmit opportunity (TXOP) during which the frame is transmitted. In some examples, the apparatus 600 is operable/configured to carry out the method 400 described above with reference to FIG. 4.

It should be noted that the above-mentioned examples illustrate rather than limit the invention, and that those skilled in the art will be able to design many alternative examples without departing from the scope of the appended statements. The word “comprising” does not exclude the presence of elements or steps other than those listed in a claim, “a” or “an” does not exclude a plurality, and a single processor or other unit may fulfil the functions of several units recited in the statements below. Where the terms, “first”, “second” etc. are used they are to be understood merely as labels for the convenient identification of a particular feature. In particular, they are not to be interpreted as describing the first or the second feature of a plurality of such features (i.e., the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a station (STA) of reducing or avoiding interference, the method comprising:

receiving at least a preamble or a physical layer (PHY) header of a frame, the preamble or the physical layer (PHY) header including a basic service set (BSS) color information field;

determining that a value in the BSS color information field corresponds to a super-color of a range of super-colors, the super-color providing an indication that one or more STAs should reduce or avoid causing interference during transmission of the frame or during a transmit opportunity (TXOP) during which the frame is transmitted;

determining, based on the super-color, a relative priority associated with the frame, each super-color of the range of super-colors corresponding to a different relative priority; and based on the determined relative priority, reducing or avoiding interference during the transmission of the frame or during the TXOP during which the frame is transmitted.

2. The method of claim 1, wherein reducing or avoiding interference during the transmission of the frame or for the duration of the TXOP during which the frame is transmitted comprises one or more of:

switching to a channel or band other than the channel or band in which the frame is transmitted;

reducing a maximum transmission power of a further frame transmitted by the STA;

reducing a threshold associated with Clear Channel Assessment (CCA) in the channel or band in which the frame is transmitted;

refraining from transmitting for a predetermined time after receiving the at least the preamble or the physical layer (PHY) header of the frame;

refraining from transmitting on frequency resources used by transmission of the frame;

applying precoding to reduce interference at one or more receivers of the frame.

3. The method of claim 1, wherein the indication comprises an indication of a type of data in the frame and wherein the type of data comprises one or more of high priority data, low latency data and high reliability data.

4. The method of claim 1, wherein the indication comprises one of one or more predetermined values in a color field in the preamble.

5. The method of claim 1, wherein the indication comprises a bit or field in the preamble or the PHY header that is reserved in an IEEE 802.11ax standard or earlier IEEE 802.11 standard.

6. The method of claim 1, wherein the indication comprises a priority tag.

7. The method of claim 1, wherein the frame is transmitted in unlicensed spectrum.

8. The method of claim 1, wherein the frame is transmitted according to an IEEE 802.11 standard.

9. The method of claim 1, wherein the STA comprises an access point (AP) STA or a non-AP STA.

10. A method in a station (STA) of transmitting a frame, the method comprising:

transmitting the frame, the frame including a preamble or a physical layer (PHY) header, and the preamble or the physical layer (PHY) header including a basic service set (BSS) color information field;

setting a value in the BSS color information field to correspond to a super-color of a range of super-colors, the super-color providing an indication that one or more other STAs should reduce or avoid causing interference during transmission of the frame or during a transmit opportunity (TXOP) during which the frame is transmitted; and setting the super-color based on a relative priority associated with the frame, each super-color of the ranges of super-colors corresponding to a different relative priority.

11. The method of claim 10, wherein the indication comprises an indication of a type of data in the frame, wherein the type of data comprises one or more of high priority data, low latency data and high reliability data.

12. The method of claim 10, wherein the indication comprises one of one or more predetermined values in a color field in the preamble.

13. The method of claim 10, wherein the indication comprises a bit or field in the preamble or the PHY header that is reserved in an IEEE 802.11ax standard or earlier IEEE 802.11 standard.

14. The method of claim 10, wherein the indication comprises a priority tag.

15. The method of claim 10, wherein transmitting the frame comprises transmitting the frame in unlicensed spectrum.

16. The method of claim 10, wherein transmitting the frame comprises transmitting the frame according to an IEEE 802.11 standard.

17. The method of claim 10, wherein the STA comprises an access point (AP) STA or a non-AP STA.

18. The method of claim 10, comprising, before transmitting the frame:

determining that a further frame is being transmitted by at least one other STA, and a preamble or PHY header of the further frame includes a further indication that does not indicate that the STA should reduce or avoid causing interference during the transmission of the further frame or for a duration of a TXOP during which the further frame is transmitted;

and wherein transmitting the frame comprises transmitting the frame while the further frame is being transmitted.

19. An apparatus in a station (STA) for reducing or avoiding interference, the apparatus comprising a processor and a memory, the memory containing instructions executable by the processor such that the apparatus is operable to:

receive at least a preamble or a physical layer (PHY) header of a frame, the preamble or the physical layer (PHY) header including a basic service set (BSS) color information field;

determine that a value in the BSS color information field corresponds to a super-color of a range of super-colors, the super-color providing an indication that one or more STAs should reduce or avoid causing interference during the transmission of the frame or during a transmit opportunity (TXOP) during which the frame is transmitted;

determine, based on the super-color, a relative priority associated with the frame, each super-color of the range of super-colors corresponding to a different relative priority; and based on the determined relative priority, reduce or avoiding interference during the transmission of the frame or during the TXOP during which the frame is transmitted.

20. An apparatus in a station (STA) for transmitting a frame, the apparatus comprising a processor and a memory, the memory containing instructions executable by the processor such that the apparatus is operable to:

transmit the frame, the frame including a preamble or a physical layer (PHY) header, and the preamble or the physical layer (PHY) header including a basic service set (BSS) color information field;

set a value in the BSS color information field to correspond to a super-color of a range of super-colors, the super-color providing an indication that one or more other STAs should reduce or avoid causing interference during transmission of the frame or during a transmit opportunity (TXOP) during which the frame is transmitted; and set the super-color based on a relative priority associated with the frame, each super-color of the range of super-colors corresponding to a different relative priority.

* * * * *